US012665197B2

(12) United States Patent
Kim

(10) Patent No.: US 12,665,197 B2
(45) Date of Patent: Jun. 23, 2026

(54) ANODE FOR LITHIUM SECONDARY BATTERY, AND LITHIUM SECONDARY BATTERY

(71) Applicant: SAMSUNG SDI CO., LTD., Yongin-si (KR)

(72) Inventor: Jungjoon Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 781 days.

(21) Appl. No.: 17/908,760

(22) PCT Filed: Jan. 11, 2021

(86) PCT No.: PCT/KR2021/000303
§ 371 (c)(1),
(2) Date: Sep. 1, 2022

(87) PCT Pub. No.: WO2021/177589
PCT Pub. Date: Sep. 10, 2021

(65) Prior Publication Data
US 2023/0118457 A1 Apr. 20, 2023

(30) Foreign Application Priority Data
Mar. 4, 2020 (KR) ........................ 10-2020-0027155

(51) Int. Cl.
*H01M 4/62* (2006.01)
*H01M 4/02* (2006.01)
(Continued)

(52) U.S. Cl.
CPC ......... *H01M 4/623* (2013.01); *H01M 4/0404* (2013.01); *H01M 10/052* (2013.01); *H01M 2004/027* (2013.01)

(58) Field of Classification Search
CPC .. H01M 4/62; H01M 4/623; H01M 2004/027; H01M 4/628; H01M 4/0404
See application file for complete search history.

(56) References Cited

U.S. PATENT DOCUMENTS 9,466,855 B2 10/2016 Ito et al.
2009/0136855 A1 5/2009 Yamaguchi et al.
(Continued)

FOREIGN PATENT DOCUMENTS

JP 2019-033045 A 2/2019
JP 2019-215961 A 12/2019
(Continued)

OTHER PUBLICATIONS

Kim, K. et al. Understanding the thermal instability of fluoroethylene carbonate in LiPF6-based electrolytes for lithium ion batteries. Electrochimica Acta. 225, 358-368 (Year: 2017).*
Markevich, E. et al. Fluoroethylene Carbonate as an Important Component for the Formation of an Effective Solid Electrolyte Interphase on Anodes and Cathodes for Advanced Li—ion Batteries. ACS Energy Letters. 2, 6 (Year: 2017).*
(Continued)

*Primary Examiner* — Marla D McConnell
*Assistant Examiner* — Julia S Caserto
(74) *Attorney, Agent, or Firm* — Lee IP Law, P.C.

(57) ABSTRACT

The present invention relates to an anode for a lithium secondary battery, and a lithium secondary battery comprising same, wherein the anode includes a current collector, and an anode active material layer including an anode active material formed on the current collector, and a coating part formed on the anode active material layer, wherein the coating part and the anode active material layer comprise particles of CHF—$CO_3$ group-containing compound.

11 Claims, 14 Drawing Sheets

(51) Int. Cl.
*H01M 4/04* (2006.01)
*H01M 10/052* (2010.01)

(56) References Cited

U.S. PATENT DOCUMENTS

| | | | | |
|---|---|---|---|---|
| 2011/0165467 | A1 | 7/2011 | Yew et al. | |
| 2015/0188125 | A1 | 7/2015 | Korgel et al. | |
| 2015/0243992 | A1* | 8/2015 | Maruyama ........ | H01M 10/0566 29/623.5 |
| 2016/0190597 | A1 | 6/2016 | Kim et al. | |
| 2016/0365572 | A1 | 12/2016 | Mun et al. | |
| 2021/0175584 | A1 | 6/2021 | Shin et al. | |
| 2021/0288349 | A1 | 9/2021 | Son et al. | |

FOREIGN PATENT DOCUMENTS

| | | | |
|---|---|---|---|
| KR | 10-2011-0080367 | A | 7/2011 |
| KR | 10-2014-0125970 | A | 10/2014 |
| KR | 10-2016-0034183 | A | 3/2016 |
| KR | 10-2016-0040160 | A | 4/2016 |
| KR | 10-2016-0081688 | A | 7/2016 |
| KR | 10-2016-0144832 | A | 12/2016 |
| KR | 10-2018-0101043 | A | 9/2018 |
| KR | 10-2019-0088353 | A | 7/2019 |

OTHER PUBLICATIONS

Trinh, N. D., et al. An Artificial Lithium Protective Layer that Enables the Use of Acetonitrile-Based Electrolytes in Lithium Metal Batteries. Angewandte Chemie International Edition. 57, 5072-5075 (Year: 2018).*

Yan, C. et al. Dual-Layered Film Protected Lithium Metal Anode to Enable Dendrite-Free Lithium Deposition. Advanced Materials. 30, 15, 1707629 (Year: 2018).*

Liu, D. et al. Positive film-forming effect of fluoroethylene carbonate (FEC) on high-voltage cycling with three-electrode LiCoO2/ Graphite pouch cell. Electrochimica Acta. 269, 378-387. (Year: 2018).*

Song, J. et al. Effect of Fluoroethylene Carbonate on Electrochemical Performances of Lithium Electrodes and Lithium-Sulfur Batteries. Journal of The Electrochemical Society. 160, A873. (Year: 2013).*

Xu, R. et al. Artificial Interphases for Highly Stable Lithium Metal Anode. Matter. 1, 2, 317-344. (Year: 2019).*

Korean Notice of Allowance dated Feb. 28, 2025.

Markevich et al., Journal of the Electrochemical Society, 160 (10) A1824-A1833 (2013).

International Search Report dated Apr. 15, 2021 for PCT/KR2021/000303.

* cited by examiner

ANODE FOR LITHIUM SECONDARY BATTERY, AND LITHIUM SECONDARY BATTERY

CROSS-REFERENCE TO RELATED APPLICATIONS

This application is the U.S. national phase of PCT Application No. PCT/KR2021/000303 filed on Jan. 11, 2021, and claims priority to and the benefit of Korean Patent Application No. 10-2020-0027155 filed in the Korean Intellectual Property Office on Mar. 4, 2020, the entire contents of which are incorporated herein by reference.

TECHNICAL FIELD

It relates an anode for a lithium secondary battery and a lithium secondary battery including the same.

BACKGROUND ART

Recently, the rapid supplement of electronic devices such as mobile phones, laptop computers, and electric vehicles, using batteries require surprising increases in demands for secondary batteries with relatively high capacity and lighter weight.

Particularly, a lithium secondary battery has recently drawn attention as a driving power source for portable devices, as it has lighter weight and high energy density. Accordingly, researches for improving performances of lithium secondary batteries are actively studied.

A lithium secondary battery includes a cathode and an anode which may include an active material being capable of intercalating and deintercalating lithium ions, and an electrolyte, and generate electrical energy due to an oxidation and reduction reaction when lithium ions are intercalated and deintercalated into the cathode and the anode.

As for a cathode active material of a lithium secondary battery, transition metal compounds such as lithium cobalt oxides, lithium nickel oxides, and lithium manganese oxide are mainly used. As the anode active material, a crystalline carbonaceous material such as natural graphite or artificial graphite, or an amorphous carbonaceous material is used.

TECHNICAL PROBLEM

One embodiment provides an anode for a lithium secondary battery being capable of improving the cycle-life characteristics.

Another embodiment provides a lithium secondary battery including the anode.

TECHNICAL SOLUTION

One embodiment provides an anode for a lithium secondary battery including a current collector; an anode active material layer formed on the current collector; and a coating part formed on the anode active material layer, wherein a surface area of the anode active material layer and the coating part include particles of a CHF—$CO_3$ group-containing compound.

The CHF—$CO_3$ group-containing compound may be represented by Chemical Formula 1 or Chemical Formula 2.

[Chemical Formula 1]

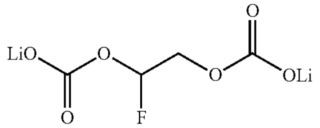

[Chemical Formula 2]

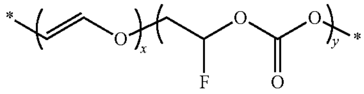

(In Chemical Formula 2, x and y are each a mole fraction, and $0.1 \leq x \leq 0.9$, $0.1 \leq y \leq 0.9$, and $x+y=1$).

The CHF—$CO_3$ group-containing compound particle may have a particle diameter of 2 μm or less. Furthermore, the CHF—$CO_3$ group-containing compound particle may have a particle diameter of 100 nm to 2 μm.

The coating part may be formed by agglomerating the CHF—$CO_3$ group-containing compound particles.

The coating part may have a thickness of 100 nm to 2 μm.

An amount of the CHF—$CO_3$ group-containing compound particle included in the anode may be 3 wt % to 6 wt % based on the total 100 wt % of the anode.

According to another embodiment, a lithium secondary battery including the anode, a cathode, and a non-aqueous electrolyte is provided.

The non-aqueous electrolyte may include a fluoroethylene carbonate additive.

ADVANTAGEOUS EFFECTS

The anode for a lithium secondary battery according to one embodiment may exhibit excellent cycle-life characteristics.

MODE FOR INVENTION

Hereinafter, embodiments are described in detail. However, these embodiments are exemplary, the present invention is not limited thereto, and the present invention is defined by the scope of claims.

The anode for a lithium secondary battery according to one embodiment includes: a current collector; an anode material layer formed on the current collector, and a coating part, and a surface of the anode active material layer and the coating part includes particles of a CHF—$CO_3$ group-containing compound.

Figure 1:
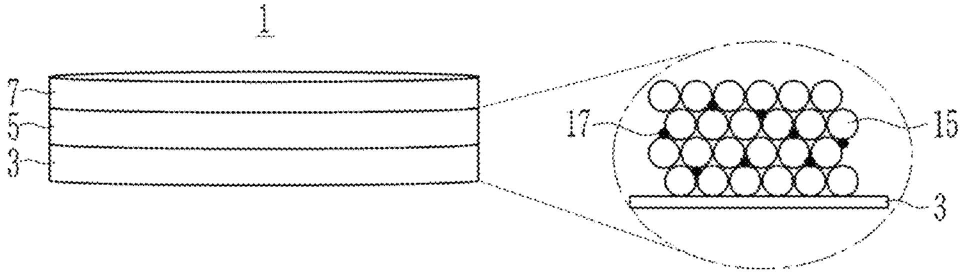
FIG. 1 is a schematic view showing the structure of the anode for a lithium secondary battery according to an embodiment.

That is, the particles of the CHF—$CO_3$ group-containing compound may be positioned on a surface area of the anode active material layer and may also be positioned on the coating part formed on the anode active material layer. As schematically shown in FIG. 1, the anode 1 according to one embodiment includes a current collector 3, an anode active material layer 5, and a coating part 7 positioned on a surface of the anode active material layer 5, and the anode active material layer 5 includes the anode active material 15 and particles of the CHF—$CO_3$ group-containing compound 17, and are enlarged. FIG. 1 indicates the coating part 7 in a layer form, but it briefly shows the coating part 7, and the coating part 7 is formed by agglomerating the particles of the CHF—$CO_3$ group-containing compound, and is positioned in a particle form, rather than a layer form, i.e., a film form.

Generally, when a lithium secondary battery using an electrolyte, particularly, including a fluoroethylene carbonate additive, as the electrolyte is charged and discharged, the fluoroethylene carbonate reacts with the anode active material to form an SEI (solid electrolyte interface) thin layer including LiF on a surface of the anode active material layer, thereby improving the cycle-life characteristics. However, as repeated charge and discharge are performed, the fluoroethylene carbonate additive is consumed which causes an abrupt reduction in the cycle-life characteristics.

As described above, in the anode for the lithium secondary battery according to one embodiment, the particles of the CHF—$CO_3$ group-containing compound are included in the surface area of the anode active material layer, and the coating part including the particles of the CHF—$CO_3$ group-containing compound are further formed on the anode active material layer, thereby reducing a consumed amount of the fluoroethylene carbonate additive and preventing the fading of the cycle-life characteristic due to the consumption of the fluoroethylene carbonate additive, and slowing the depletion of the fluoroethylene carbonate additive and the electrolyte, thereby improving the cycle-life characteristics.

Furthermore, the effects of including the particles of the CHF—$CO_3$ group-containing compound may only be obtained from the inclusion of the particles of the CHF—$CO_3$ group-containing compound in the coating part positioned on the anode active material layer and the surface area of the anode active material layer, but, if it is not included in the surface area of the anode active material layer and is only included in the coating part positioned in the anode active material layer, the effect for improving the cycle-life characteristics is not satisfied as the depletion of the additive and the electrolyte on the surface of the anode is not prevented, and thus, it is not desired.

The CHF—$CO_3$ group-containing compound may be represented by Chemical Formula 1 or Chemical Formula 2.

[Chemical Formula 1]

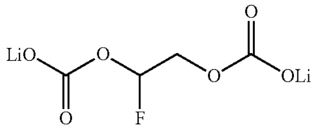

[Chemical Formula 2]

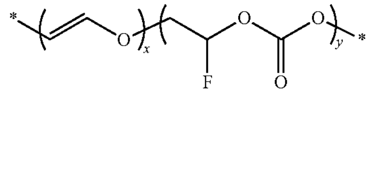

In Chemical Formula 2, x and y are each a mole fraction, and $0.1 \leq x \leq 0.9$, $0.1 \leq y \leq 0.9$, and $x+y=1$.

A weight-average molecular weight (Mw) of the compound represented by Chemical Formula 2 is 1000 g/mol to 5,000,000 g/mol.

The CHF—$CO_3$ group-containing compound particle may have a particle diameter of 2 μm or less, and the CHF—$CO_3$ group-containing compound particle may have a particle diameter of 100 nm to 2 μm. When the particles of the CHF—$CO_3$ group-containing compound have a particle diameter within the range, it may be effectively distributed between the anode active material particles. The particle diameter may be the average particle diameter of the particles. In this case, the average particle diameter may mean a particle diameter (D50) measured as a cumulative volume. Unless otherwise defined herein, the particle diameter (D50) means the average particle diameter (D50), which means the diameter of particles having a cumulative volume of 50 volume % in the particle size distribution.

The average particle size (D50) may be measured by a method that is well known to those skilled in the art, for example, by a particle size analyzer, or by a transmission electron microscopic image, or a scanning electron microscopic image. Alternatively, a dynamic light-scattering measurement device is used to perform a data analysis, and the number of particles is counted for each particle size range. From this, the average particle diameter (D50) value may be easily obtained through a calculation.

The coating part may have a thickness of 100 nm to 2 μm. When the thickness of the coating part is within the range, the consumed amount of fluoroethylene carbonate may be effectively reduced. If the thickness of the coating part is higher than the range, it is not desired because resistance due to the formation of the coating part is surprisingly increased, and if it is lower than the range, the improvements in the cycle-life characteristics may be insignificant. As the coating part is positioned by agglomerating the CHF—$CO_3$ group-containing compound particles, rather than a film form with a constant thickness, the thickness indicates an average thickness of the thickest thickness and the thinnest thickness.

An amount of the CHF—$CO_3$ group-containing compound particles included in the anode may be 3 wt % to 6 wt % based on the total, 100 wt % (except for the current collector) of the anode. When the amount of the CHF—$CO_3$ group-containing compound particles included in the anode is satisfied in the range, the long cycle-life characteristics may be improved.

In one embodiment, the anode active material may be a carbon-based active material, a silicon-based active material, or a combination thereof.

The carbon-based active material may be crystalline carbon, amorphous carbon, or a combination thereof. Examples of the crystalline carbon may be unspecified shaped, sheet-shaped, flake-shaped, spherically-shaped, or fiber-shaped natural graphite or artificial graphite, and examples of the amorphous carbon may be soft carbon, hard carbon, mesophase pitch carbide, sintered cokes, etc.

The silicon-based active material may be a Si-based anode active material or a Sn-based anode active material. The Si-based anode active material may be Si, a Si—C composite, $SiO_x$ ($0<x<2$), and a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), and the Sn-based anode active material is selected from Sn, $SnO_2$, an S—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Si), and the like, and also, a mixture of at least one thereof with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

According to one embodiment, the anode active material may be a Si-carbon composite and the Si-carbon composite may include silicon particles and crystalline carbon. The silicon particle may have a particle diameter of 10 nm to 200 nm. The Si—C composite may further include an amorphous carbon layer formed on at least one part thereof. When a definition is not otherwise provided in the specification, such a particle diameter (D50) indicates a particle diameter where a cumulative volume is about 50 volume % in a particle distribution.

According to another embodiment, the anode active material may be used by mixing two or more of the anode active materials, and for example, may include the Si-carbon composite as the first anode active material and crystalline carbon as the second anode active material. When two or more of the anode active materials are mixed and used as the anode active material, the mixing ratio thereof may be suitably controlled, but it may be suitable to control amount of Si to be 3 wt % to 50 wt % based on the total weight of the anode active material.

Herein, a particle diameter of the Si-carbon composite may be 5 μm to 25 μm, the average particle diameter D50 may be 10 μm to 15 μm, and a particle diameter of the crystalline carbon may be 6 μm to 26 μm, and an average particle diameter D50 may be 10 μm to 15 μm.

The anode active material layer may be formed on one side or both sides of the current collector, and herein, a thickness of the anode active material layer may be 60 μm to 90 μm based on one-side coating. When the thickness of the anode active material layer is within the range, the effect for preventing fading of the cycle-life characteristics due to the enlarged consumed amount of the fluoroethylene carbonate additive included in the electrolyte as the repeated cycles by using the CHF—$CO_3$ group-containing compound may be maximized.

The anode active material layer includes an anode active material and a binder, and may optionally further include a conductive material.

The amount of the anode active material may be 95 wt % to 99 wt % based on the total weight of the anode active material layer.

The amount of the binder may be about 1 wt % to about 5 wt % based on the total weight of the anode active material layer. Furthermore, when the conductive material is further included, about 90 wt % to about 98 wt % of the anode active material, about 1 wt % to about 5 wt % of the binder, and about 1 wt % to about 5 wt % of the conductive material may be included.

The binder improves binding properties of anode active material particles with one another and with a current collector. The binder may be a non-aqueous binder, an aqueous binder, or a combination thereof.

The non-aqueous binder may be an ethylene propylene copolymer, s polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The aqueous binder may include a styrene-butadiene rubber, an acrylated styrene-butadiene rubber, an acrylonitrile-butadiene rubber, an acrylic rubber, a butyl rubber, a fluorine rubber, an ethylene oxide-containing polymer, polyvinylpyrrolidone, polyepichlorohydrin, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the aqueous binder is used as an anode electrode binder, a cellulose-based compound may be further used to provide viscosity as a thickener. The cellulose-based compound includes one or more of carboxymethyl cellulose, hydroxypropyl methylcellulose, methyl cellulose, or alkali metal salts thereof. The alkali metal may be Na, K, or Li. The thickener may be included in an amount of about 0.1 parts by weight to about 3 parts by weight based on 100 parts by weight of the anode active material.

The conductive material is included to provide electrode conductivity. Any electrically conductive material may be used as a conductive material unless it causes a chemical change.

Examples of the conductive material may include a carbon-based material such as natural graphite, artificial graphite, carbon black, acetylene black, ketjen black, denka black, carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

Hereinafter, the anode may be prepared by the following procedures.

First of all, an anode active material composition including an anode active material and a binder, and optionally, a conductive material, and a solvent is coated on a current collector and dried to prepare an anode active material layer. The anode active material, the binder and the conductive material are the same as above. Furthermore, the solvent may be an organic solvent such as N-methyl pyrrolidone, or may be water when the aqueous binder is used as the binder.

Thereafter, a composition for preparing a coating part is coated on the anode active material layer and dried to prepare a coating part, and then pressurized.

The drying may be performed at 105° C. to 110° C. and may be performed for 10 minutes to 15 minutes. When the drying is performed at the temperature range, the residual moisture in the anode active material layer and the coating part may be substantially and completely evaporated, and when the drying is performed for the time, over-drying of the electrode may be prevented.

The composition for preparing the coating part may be prepared by mixing fluoroethylene carbonate and water until a concentration of fluoroethylene carbonate is 10 wt % to 50 wt % to prepare a mixed solution and heat-treating the mixed solution.

The heat treatment may be appropriately performed within the temperature and the time in which a ring opening reaction of fluoroethylene carbonate may occur, while the mixed solution is maintained in a liquid state after heat-treating, and for example, at 100° C. to 150° C., and for 1 hour to 5 hours.

In addition, when the heat treatment is performed at the temperature range for the time, the composition for preparing the coating part may suitably have a concentration to readily immerse the surface area of the active material layer, for example, at 5 wt % to 20 wt %.

Meanwhile, if the heat treatment is performed at a lower temperature than the above, or for a shorter time than the above the ring opening reaction of fluoroethylene carbonate insufficiently occurs, and the resulting composition for preparing the coating part is too thin. In addition, if the heat treatment is performed at a higher temperature than the above temperature, or for a longer time than the above time, the ring opening reaction of fluoroethylene carbonate severely occurs, thereby preparing a solid composition which makes it impossible to form the coating part, and excessive denseness of the composition for preparing the coating part is little immersed into the active material layer.

As such, when the composition for preparing the coating part is heat-treated, fluoroethylene carbonate and water react to cause the ring opening of fluoroethylene carbonate, and thus, a $CHF—CO_3$ group-containing compound may be prepared. Thus, if the composition for preparing the coating part is coated on the anode active material layer and dried, a coating part including particles of the $CHF—CO_3$ group-containing compound particle may be formed.

Furthermore, the composition for preparing the coating part that is heat-treated is in a liquid state, so that it may immersed inside the anode active material layer to include the particles of the $CHF—CO_3$ group-containing compound particle in the surface area of the anode active material layer.

If an electrolyte including fluoroethylene carbonate is used, rather than preparing the coating part by coating the composition for preparing the coating part, the electrolyte is immersed in the active material layer, and fluorine may be present in the active material layer, but the electrolyte includes lithium salts such as $LiPF_6$ and carbonate solvents, so that the lithium salts such as $LiPF_6$ react with the active material to generate $LiPO_2F_2$, LiF, HF, etc., and it reacts with the carbonate solvents to generate lithium oxide, lithium alkoxide, etc., and thus the unwanted side reactor may be prepared, so the improvements in the cycle-life may be not obtained.

Another embodiment provides a lithium secondary battery including the anode, the cathode, and a non-aqueous electrolyte.

The cathode includes a current collector and a cathode active material layer disposed on the current collector and including a cathode active material.

A compound capable of intercalating and deintercalating lithium (lithiated intercalation compound) may be used as the cathode active material. Specifically, one or more composite oxides of a metal selected from cobalt, manganese, nickel, and a combination thereof, and lithium, may be used. As a more specific example, a compound represented by any one of the following chemical formulas may be used. $Li_aA_{1-b}X_bD_2$ ($0.90\leq a\leq 1.8$, $0\leq b\leq 0.5$); $Li_aA_{1-b}X_bO_{2-c}D_c$ ($0.90\leq a\leq 1.8$, $0\leq b\leq 0.5$, $0\leq c\leq 0.05$); $Li_aE_{1-b}X_bO_{2-c}D_c$ ($0.90\leq a\leq 1.8$, $0\leq b\leq 0.5$, $0\leq c\leq 0.05$); $Li_aE_{2-b}X_bO_{4-c}D_c$ ($0.90\leq a\leq 1.8$, $0\leq b\leq 0.5$, $0\leq c\leq 0.05$); $Li_aNi_{1-b-c}Co_bX_cD_\alpha$ ($0.90\leq a\leq 1.8$, $0\leq b\leq 0.5$, $0\leq c\leq 0.5$, $0\leq \alpha\leq 2$); $Li_aNi_{1-b-c}Co_bX_cO_{2-\alpha}T_\alpha$ ($0.90\leq a\leq 1.8$, $0\leq b\leq 0.5$, $0\leq c\leq 0.5$, $0\leq \alpha<2$); $Li_aNi_{1-b-c}Co_bX_cO_{2-\alpha}T_2$ ($0.90\leq a\leq 1.8$, $0\leq b\leq 0.5$, $0\leq c\leq 0.5$, $0\leq \alpha<2$); $Li_aNi_{1-b-c}Mn_bX_cD_\alpha$ ($0.90\leq a\leq 1.8$, $0\leq b\leq 0.5$, $0\leq c\leq 0.5$, $0\leq \alpha\leq 2$); $Li_aNi_{1-b-c}Mn_bX_cO_{2-\alpha}T_\alpha$ ($0.90\leq a\leq 1.8$, $0\leq b\leq 0.5$, $0\leq c\leq 0.5$, $0\leq \alpha\leq 2$); $Li_aNi_{1-b-c}Mn_bX_cO_{2-\alpha}T_2$ ($0.90\leq a\leq 1.8$, $0\leq b\leq 0.5$, $0\leq c\leq 0.05$, $0\leq \alpha\leq 2$); $Li_aNi_bE_cG_dO_2$ ($0.90\leq a\leq 1.8$, $0\leq b\leq 0.9$, $0\leq c\leq 0.5$, $0.001\leq d\leq 0.1$); $Li_aNi_bCo_cMn_dG_eO_2$ ($0.90\leq a\leq 1.8$, $0\leq b\leq 0.9$, $0\leq c\leq 0.5$, $0\leq d\leq 0.5$, $0.001\leq e\leq 0.1$); $Li_aNiG_bO_2$ ($0.90\leq a\leq 1.8$, $0.001\leq b\leq 0.1$); $Li_aCoG_bO_2$ ($0.90\leq a\leq 1.8$, $0.001\leq b\leq 0.1$); $Li_aMn_{1-b}G_bO_2$ ($0.90\leq a\leq 1.8$, $0.001\leq b\leq 0.1$); $Li_aMn_2G_bO_4$ ($0.90\leq a\leq 1.8$, $0.001\leq b\leq 0.1$); $Li_aMn_{1-g}G_gPO_4$ ($0.90\leq a\leq 1.8$, $0\leq g\leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0\leq f\leq 2$); $Li_{(3-f)}Fe_2(PO_4)_3$ ($0\leq f\leq 2$); $Li_aFePO_4$ ($0.90\leq a\leq 1.8$).

In the chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a cathode active material by using these elements in the compound. For example, the method may include any coating method (e.g., spray coating, dipping, etc.), but is not illustrated in more detail since it is well-known to those skilled in the related field.

In the cathode, the amount of the cathode active material may be about 90 wt % to about 98 wt % based on the total weight of the cathode active material layer.

In an embodiment, the cathode active material layer may further include a binder and a conductive material. In this case, the amount of the binder and the conductive material may be about 1 wt % to about 5 wt %, respectively, based on the total weight of the cathode active material layer.

The binder improves binding properties of cathode active material particles with one another and with a current collector. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used to impart conductivity to the electrode, and any material may be used as long as it does not cause chemical change in the battery to be configured and is an electron conductive material. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The electrolyte includes a non-aqueous organic solvent, a lithium salt, and a first additive.

The first additive may be fluoroethylene carbonate, difluoroethylene carbonate, or a combination thereof. An amount of the additive may be 1 wt % to 5 wt % based on 100 wt % of a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, propyl propionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. Furthermore, the ketone-based solvent includes cyclohexanone, and the like. The alcohol-based solvent may include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used alone or in a mixture of one or more, and when the organic solvent is used in a mixture, the mixture ratio may be controlled in accordance with a desirable battery performance.

In addition, the carbonate-based solvent is appropriately used by mixing a cyclic carbonate and a linear carbonate. When the cyclic carbonate and linear carbonate are mixed together in a volume ratio of about 1:1 to about 1:9 and used, it may have enhanced performance.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 3.

[Chemical Formula 3]

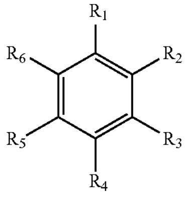

(In Chemical Formula 3, R1 to R6 are the same or different and are selected from hydrogen, a halogen, a C1 to C10 alkyl group, a haloalkyl group, and a combination thereof.)

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound as a second additive. Examples of the ethylene carbonate-based compound may include chloroethylene carbonate, dichloroethylene carbonate, bromoethylene carbonate, dibromoethylene carbonate, nitroethylene carbonate, cyanoethylene carbonate, or fluoroethylene carbonate. The amount of the second additive may be used within an appropriate range, when the second additive is further used.

The lithium salt dissolved in an organic solvent supplies a battery with lithium ions, basically operates the lithium secondary battery, and improves transportation of the lithium ions between the cathode and the anode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, where x and y are natural numbers, and for example, an integer of 0 to 20), lithium difluoro(bisoxolato) phosphate), LiCl, LiI and $LiB(C_2O_4)_2$ (lithium (oxalato) borate: LiBOB), and lithium difluoro(oxalato)borate: LiDFOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The lithium secondary battery may further include a separator between the cathode and the anode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
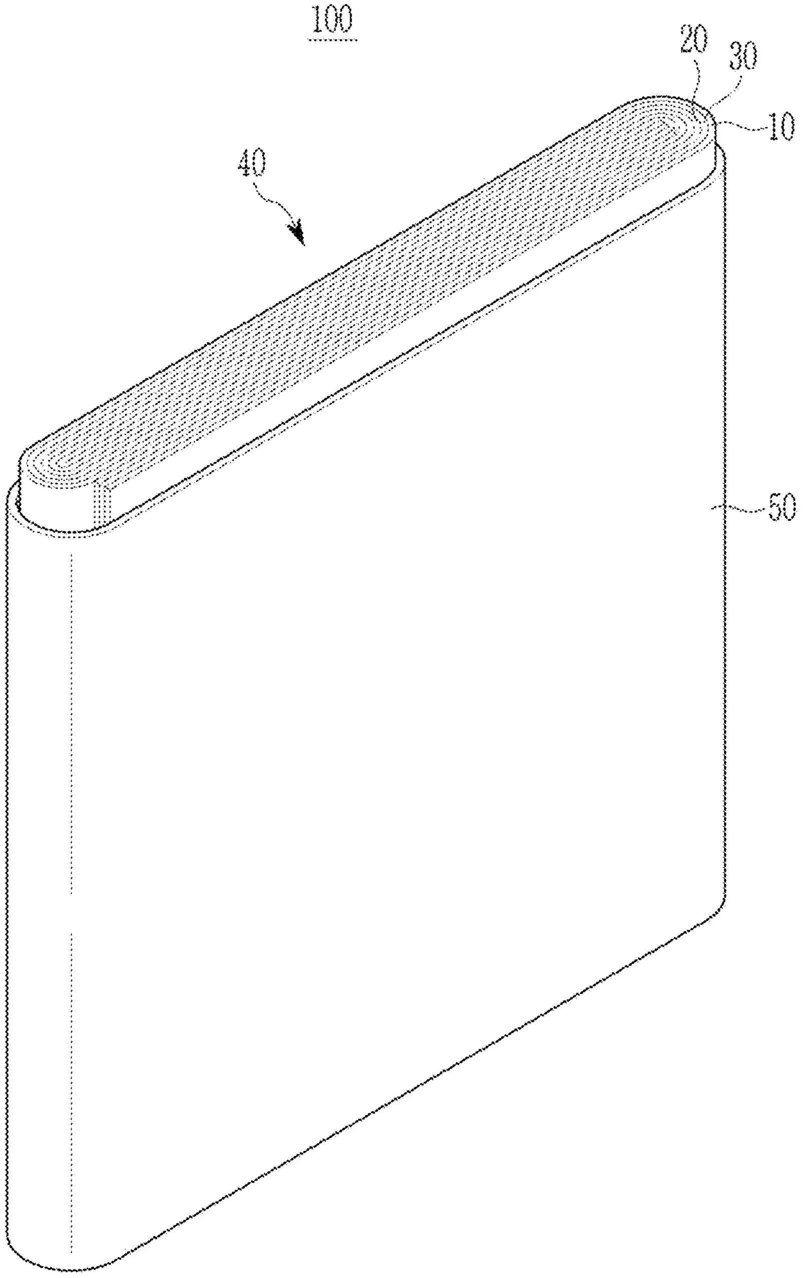
FIG. 2 is a schematic view showing the structure of a lithium secondary battery according to an embodiment.

FIG. 2 is an exploded perspective view of a lithium secondary battery according to one embodiment. The lithium secondary battery according to an embodiment is illustrated as a prismatic battery, but is not limited thereto and may include variously-shaped batteries such as a cylindrical battery, a pouch battery, and the like.

Referring to FIG. 2, a lithium secondary battery 100 according to an embodiment includes an electrode assembly 40 manufactured by winding a separator 30 interposed between a cathode 10 and an anode 20, and a case 50 housing the electrode assembly 40. An electrolyte (not shown) may be impregnated in the cathode 10, the anode 20, and the separator 30.

EXAMPLES FOR PERFORMING INVENTION

Hereinafter, examples of the present invention and comparative examples are described. These examples, however, are not in any sense to be interpreted as limiting the scope of the invention.

Example 1

97.5 wt % of a mixed anode active material (artificial graphite particle:Si—C carbon composite weight ratio=87.5:12.5) with artificial graphite particles with a particle diameter of a range of 6 μm to 26 μm and an average particle diameter D50 of 15 μm, and Si-carbon composite particles with a particle diameter of a range of 5 μm to 25 μm and an average particle diameter D50 of 13 μm, 1 wt % of carboxymethyl cellulose, and 1.5 wt % of styrene-butadiene were mixed in a water solvent to prepare an anode active material slurry composition.

The Si—C carbon composite was used by mixing Si with an average particle diameter D50 of 100 nm and artificial graphite particles at a 15:85 weight ratio and heat-treating it at 950° C.

Fluoroethylene carbonate was mixed with water to be a mixed liquid with a concentration of fluoroethylene carbonate at 20 wt %, and the mixed liquid was heat-treated at 120° C. for 2 hours to a composition for preparing a coating part in a liquid form.

The anode active material slurry composition was coated on the both sides of the Cu current collector and dried followed by pressing to prepare an anode active material layer with a thickness of 70 μm (one side).

The composition for preparing the coating part was coated on the anode active material layer and dried at 110° C. for 15 minutes to form a coating part with a thickness of 2 μm, and resultantly, an anode for a lithium secondary battery including the current collector, the anode active material layer totally including a CHF—$CO_3$ group-containing compound of Chemical Formula 2, and the coating part including a CHF—$CO_3$ group-containing compound of Chemical Formula 2 was prepared.

[Chemical Formula 2]

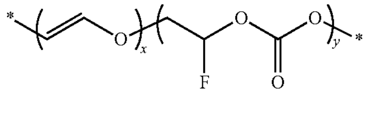

In Chemical Formula 2, x and y were each a mole fraction, and x=0.8, and y=0.2, and the compound of Chemical Formula 2 had a weight average molecular weight (Mw) of 3,000,000 g/mol.

In the anode, the amount of the CHF—$CO_3$ group-containing compound was 3.2 wt % based on the total, 100 wt % of the anode.

Using the prepared cathode, a $LiCoO_2$ cathode, and an electrolyte, a coin-type full cell was fabricated. As the electrolyte, 3.5 wt % of fluoroethylene carbonate was added thereto based on 100 wt % of a mixed solvent of ethylene carbonate, dimethyl carbonate, and ethyl methyl carbonate (20:40:40 volume ratio) in which 1.5 M $LiPF_6$ was dissolved, was used.

Comparative Example 1

The anode active material slurry composition was coated on a current collector, dried, and pressed to prepare an anode active material layer, without using the composition for preparing the coating part prepared by Example 1, thereby preparing an anode for a lithium secondary battery including a current collector and the anode active material layer.

Using the anode, a $LiCoO_2$ cathode, and an electrolyte, a coin-type full cell was fabricated. As the electrolyte, 3.5 wt % of fluoroethylene carbonate was added thereto based on 100 wt % of a mixed solvent of ethylene carbonate, propylene carbonate, ethyl propionate, and propyl propionate (15:15:25:45 volume ratio) in which 1.5 M $LiPF_6$ was dissolved, was used.

Comparative Example 2

The anode active material slurry composition was coated on a current collector, dried, and pressed to prepare an anode active material layer, without using the composition for preparing the coating part prepared by Example 1, thereby preparing an anode for a lithium secondary battery including a current collector and the anode active material layer.

Using the anode, a $LiCoO_2$ cathode, and an electrolyte, a coin-type full cell was fabricated. As the electrolyte, 3.5 wt % of fluoroethylene carbonate was added thereto based on 100 wt % of a mixed solvent of ethylene carbonate, dimethyl carbonate, and ethyl methyl carbonate (20:40:40 volume ratio) in which 1.5 M $LiPF_6$ was dissolved, was used.

Experiment 1: Measurement of X-Ray Photoelectron Spectroscopy: XPS

Figure 3:
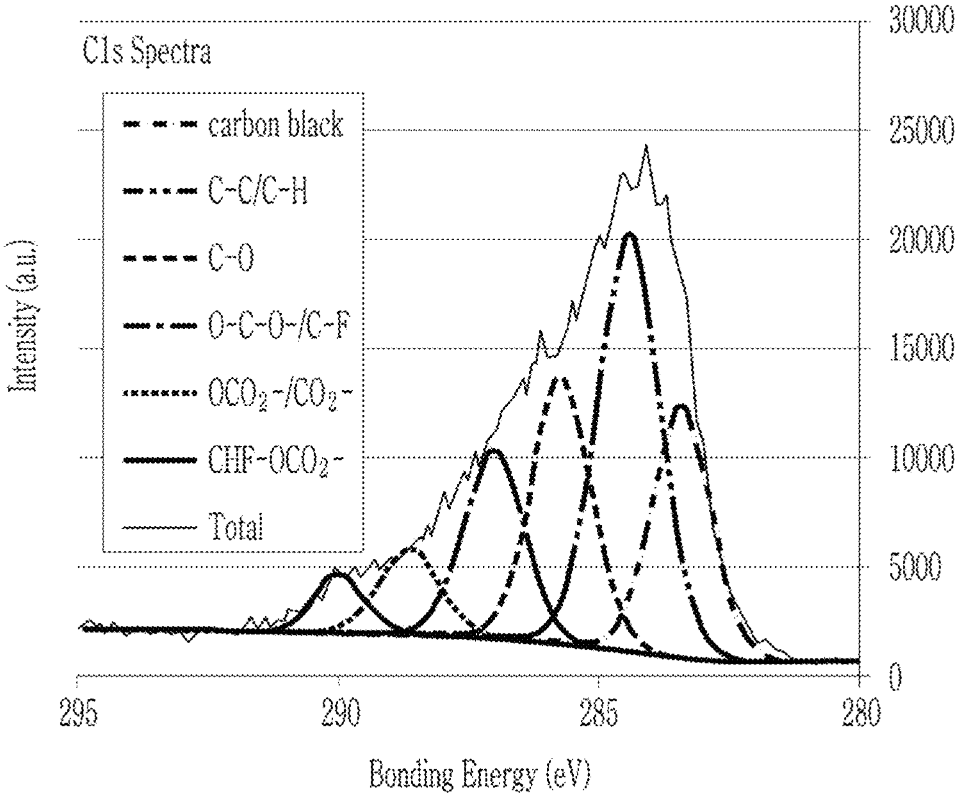
FIG. 3 is a graph showing an XPS C 1s spectrum of the anode according to Example 1.

In order to confirm the components of the coating part and the anode active material layer of Example 1, the XPS C 1S spectrum for the anode was measured and the results are shown in FIG. 3. As shown in FIG. 3, the presence of the CHF—$CO_3$ group in the coating part and the anode active material can be clearly seen, and from the measured results, the presence of a compound of Chemical Formula 2 can be seen.

[Chemical Formula 2]

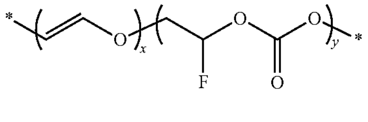

Figure 4A:
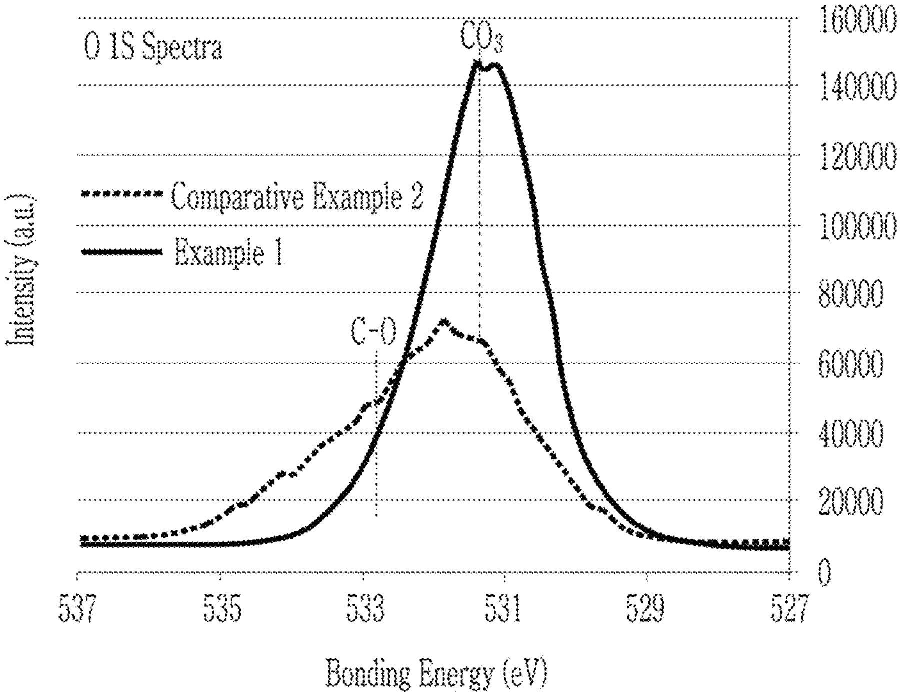
FIG. 4A is a graph showing XPS O 1S spectrum of the anodes according to Example 1 and Comparative Example 1.
Figure 4B:
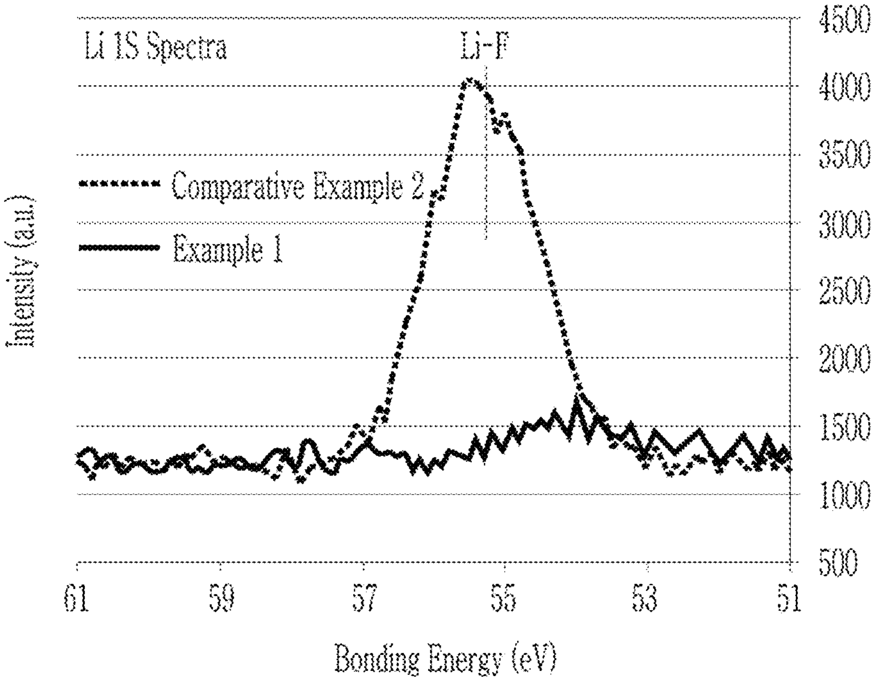
FIG. 4B is a graph showing an XPS Li 1S spectrum of the anode according to Example 1 and Comparative Example 1.

In addition, the XPS O 1S spectrums for the anodes according to Example 1 and Comparative Example 2 were measured and the results are shown in FIG. 4A, and the XPS Li 1S spectrums were measured and the results are shown in FIG. 4B. As shown in FIG. 4A and FIG. 4B, the anode of Example 1 had a higher $CO_3$ peak than Comparative Example 2 and from these results, it can be seen that the amount of the CHF—$CO_3$ group-containing compound is high and a surprisingly lower Li—F peak than Comparative Example 2, which indicated that the amount of Li—F derived from the decomposition of fluoroethylene carbonate, was abruptly reduced.

Experiment 2: EDS (Energy Dispersive X-Ray Spectroscopy) Analysis

Figure 5A:
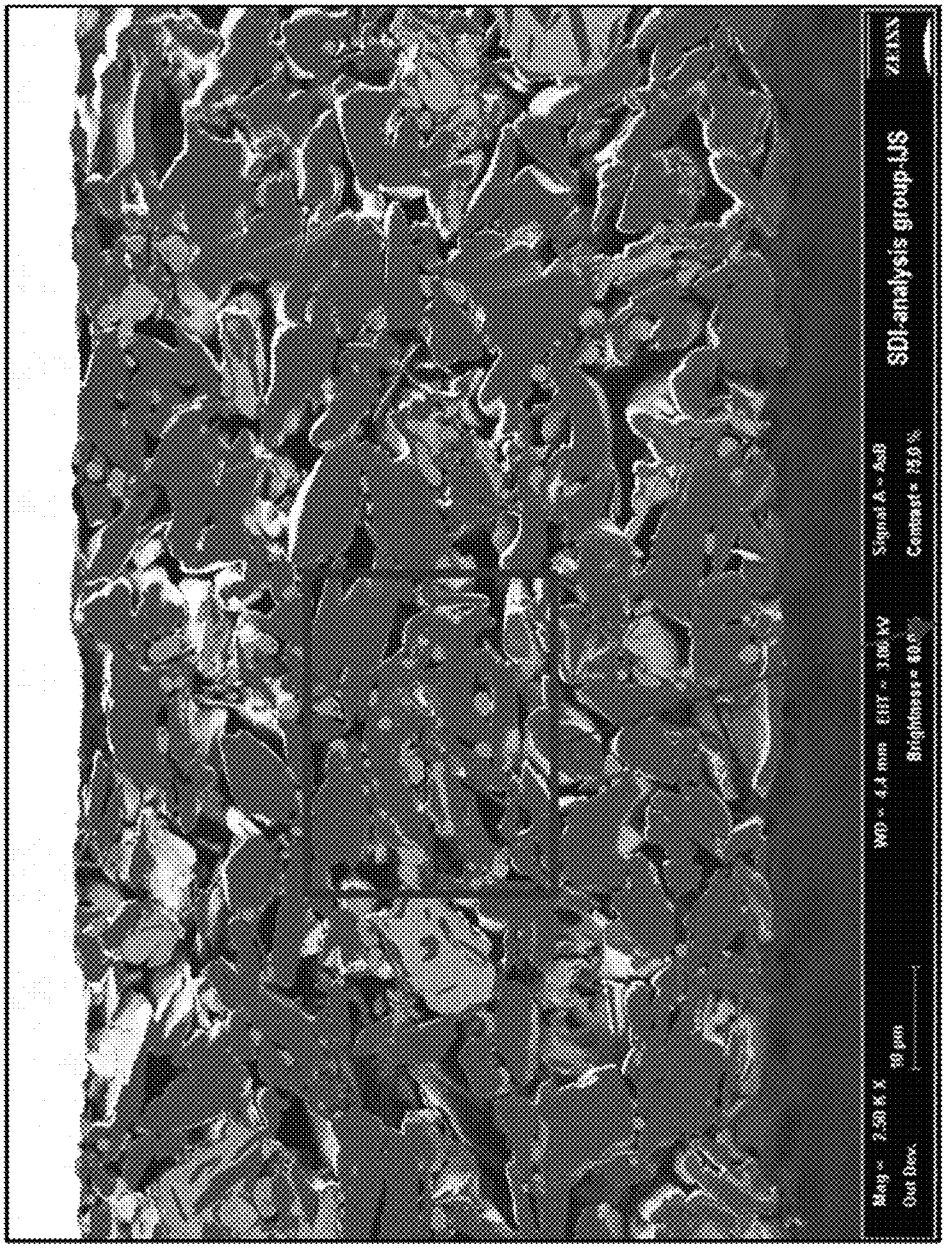
FIGS. 5A to 5D show photographs of EDS and SEM of cross-sections of the anode according to Example 1.
Figure 5B:
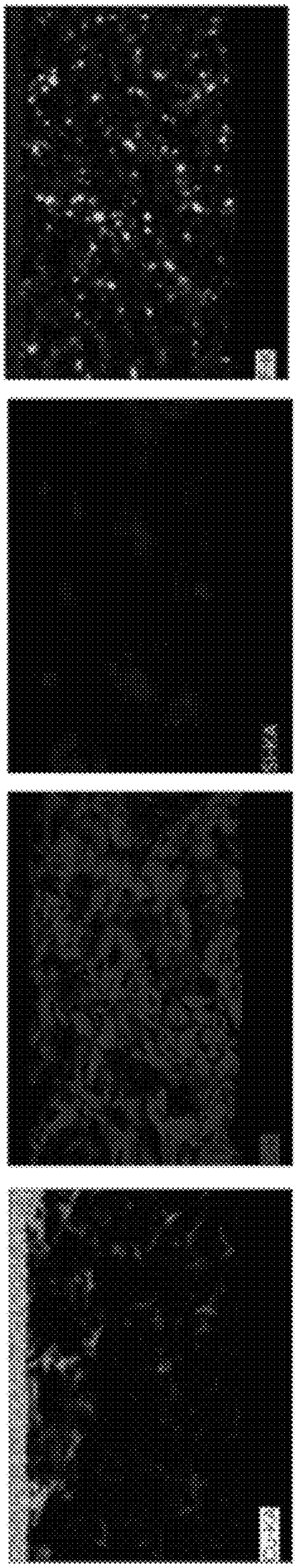
Figure 5C:
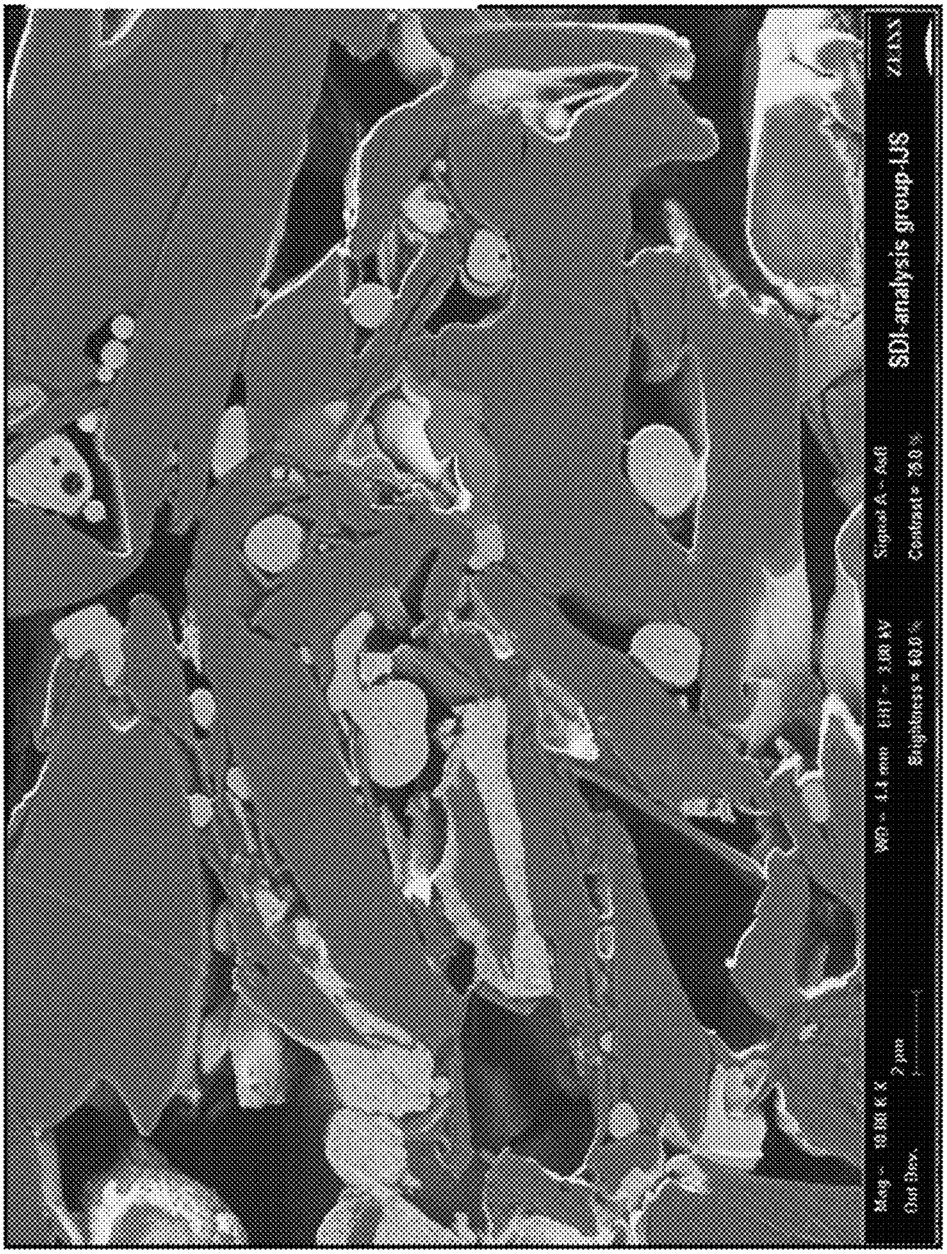

The anode according to Example 1 was cross-sectionally cut using a FIB (focused Ion Beam), and the SEM photograph for the cross-section was shown in FIG. 5A (2500 magnification), and partially enlarged and is shown in FIG. 5C (10,000 magnification ratio). Furthermore, the elements included in the anode were mapped using energy disperse x-ray spectroscopy analysis to the cross-section to analyze the cross-section morphology, and the distribution degree of C, Si, and F.

From the results, mapping photographs for C, Si and F elements are shown in FIG. 5B, and mapping photographs for the Cu current collector are also shown in FIG. 5B. In addition, among the results shown in FIG. 5B, the mapping of C, Si and F element were enlarged and they are shown in FIG. 5D.

As shown in of FIG. 5A and FIG. 5C that is enlarged thereof, the particles of the CHF—$CO_3$ group-containing compound (bright greyish dot particles) with a particle diameter of about 0.1 μm to 2 μm were distributed in the active material layer.

Figure 5D:
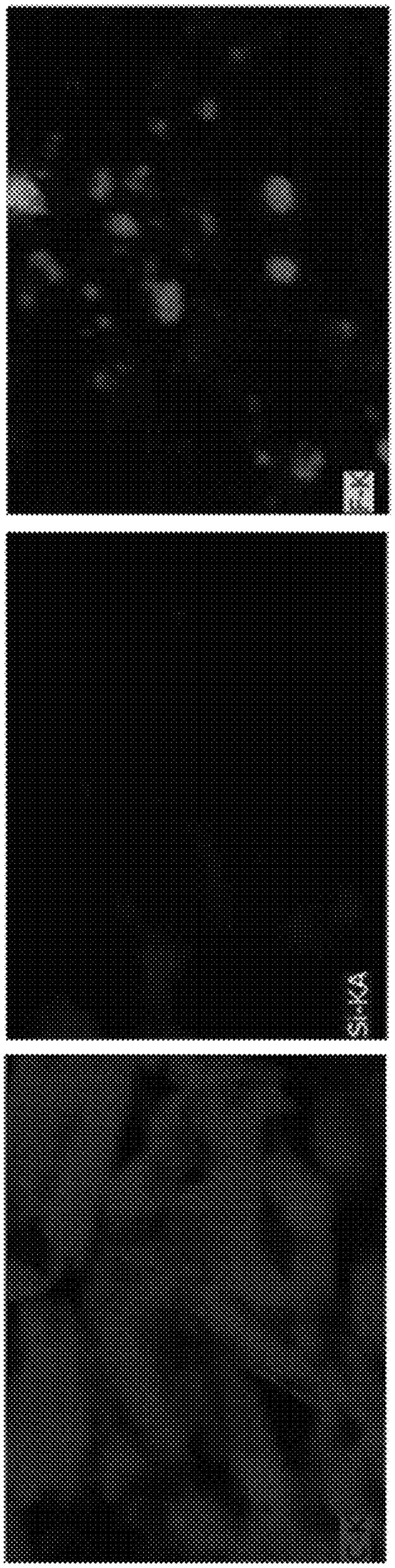

Furthermore, as shown in FIG. 5B and FIG. 5D that is enlarged thereof, F was presented in the anode active material layer.

Figure 6A:
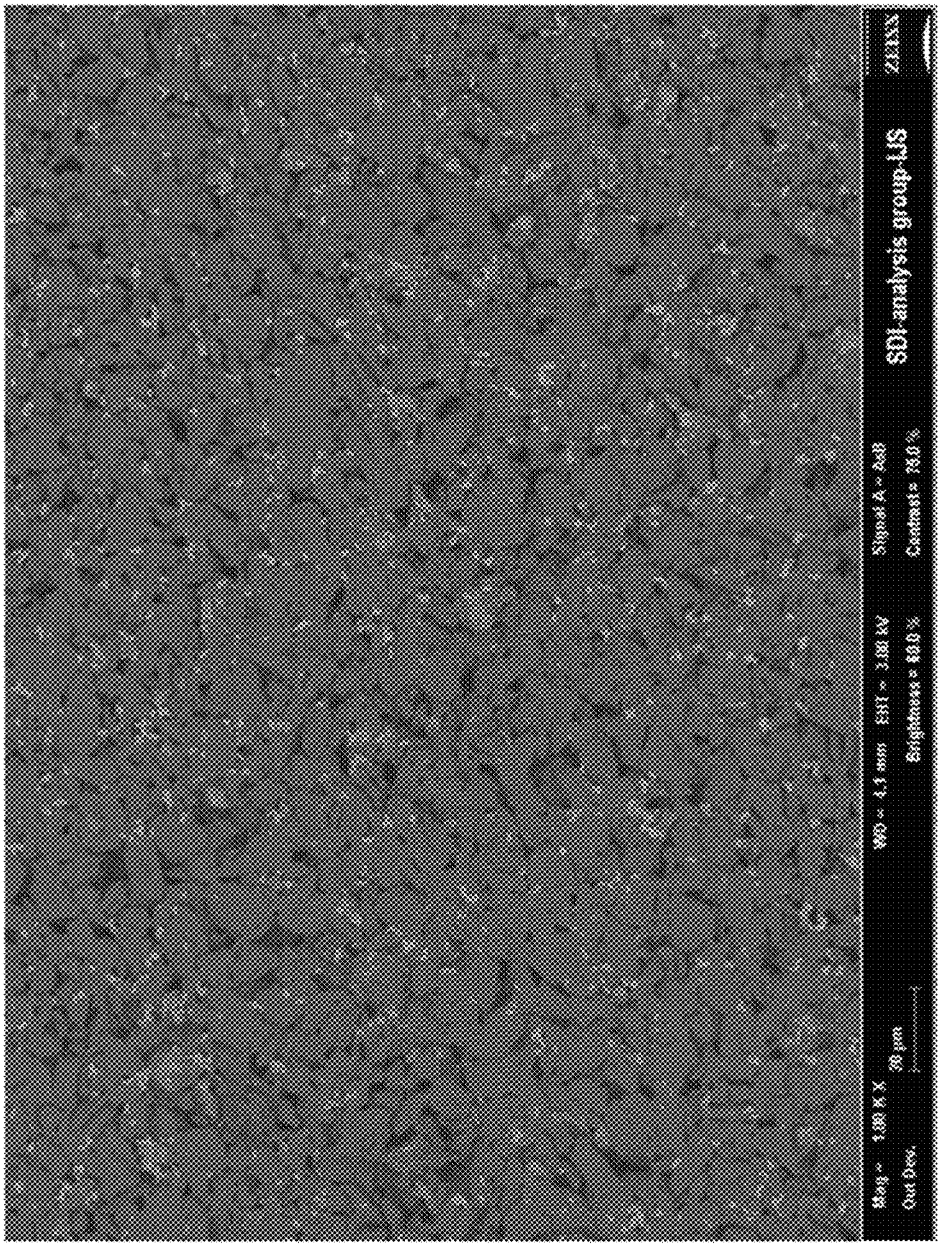
FIGS. 6A to 6D show photographs of EDS and SEM for surfaces of the anode according to Example 1.
Figure 6B:
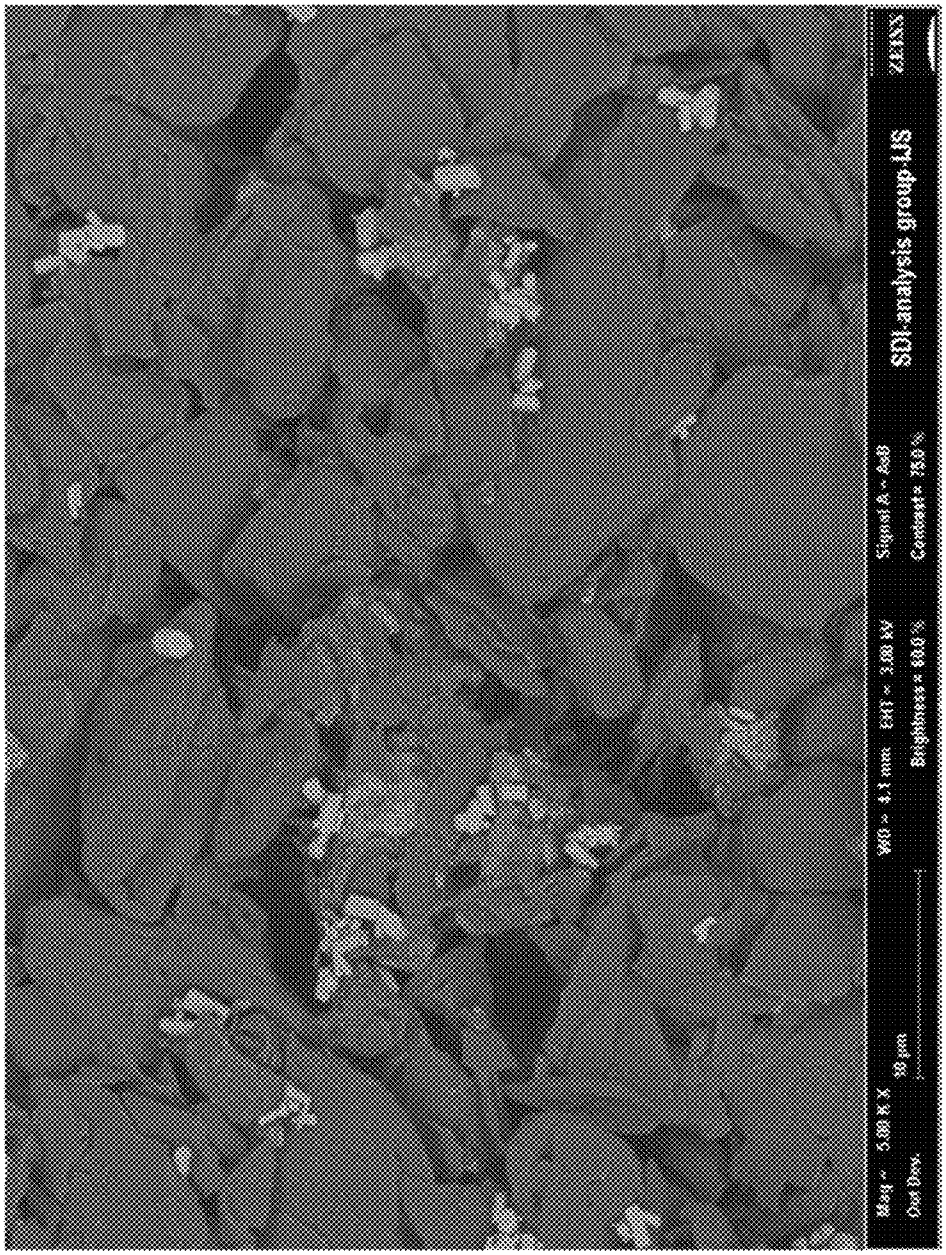
Figure 6C:
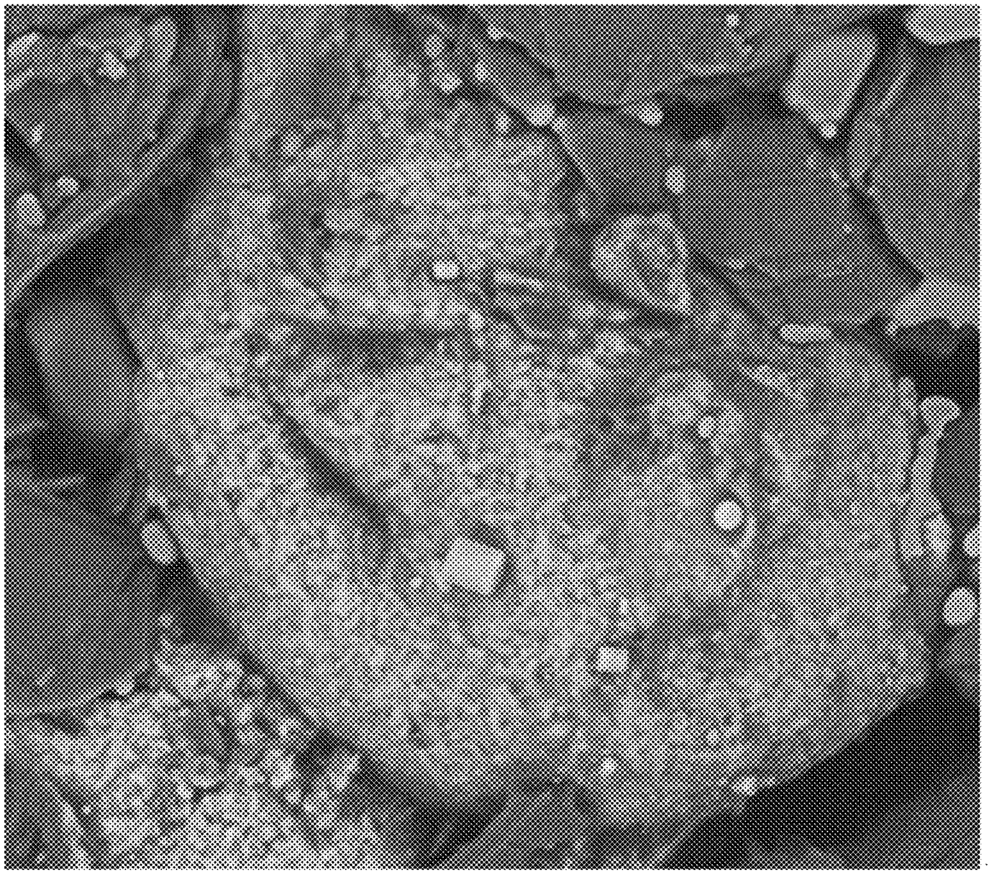

The SEM photograph for the surface of the anode according to Example 1 are shown in FIG. 6A (1000 magnification rate), FIG. 6B (5000 magnification rate), and FIG. 6C (20,000 magnification rate), and mapping for elements presented in the anode was performed by energy dispersive x-ray spectroscopy analysis and the cross-section morphology and distribution of C, Si, and F were analyzed.

Figure 6D:
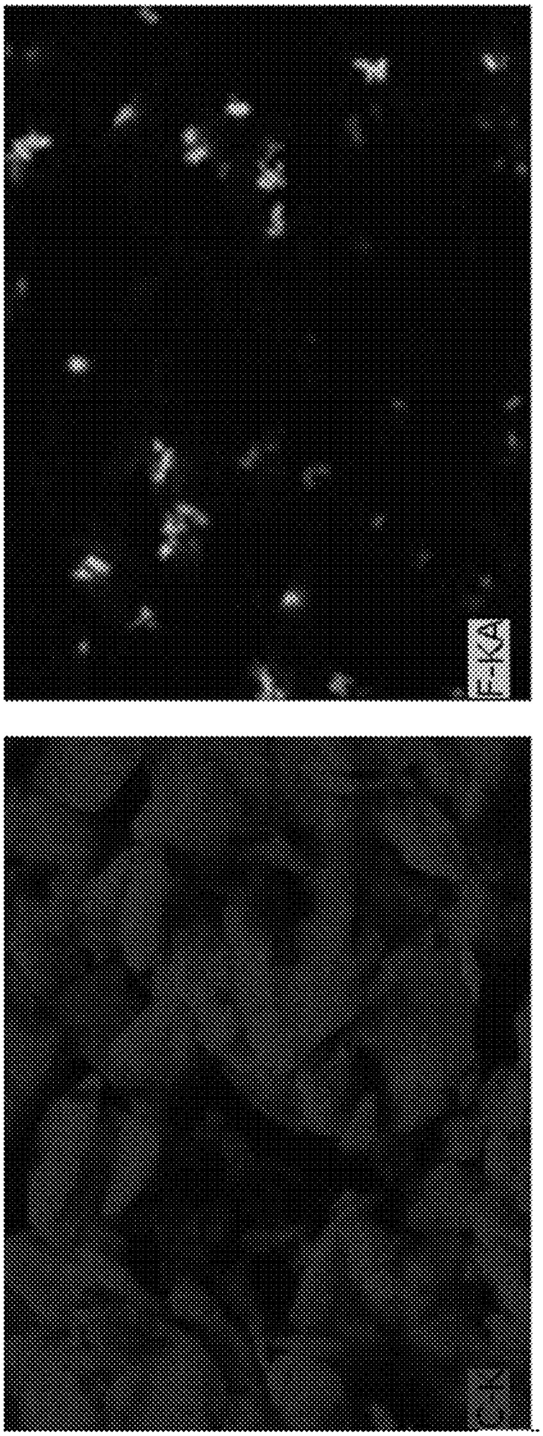

The mapping of C and F elements are shown in FIG. 6D, among of the results shown in FIG. 6B. As shown in FIG. 6A, FIG. 6B, and FIG. 6C, the particles of the CHF—$CO_3$ group-containing compound were distributed in the surface of the anode which is clearly indicated by the presence of F in the element analysis. Furthermore, it can be seen that the particles of the CHF—$CO_3$ group compound were agglomerated.

Experiment 3: Evaluation of Cycle-Life Characteristic

The charging and discharging in which coin-type full cells according to Example 1 and Comparative Examples 1 and 2 were charged under a condition of 0.7 C charging, 4.47 V and 0.025 C cut-off, and discharged under a condition of 1.0 C discharge and 3.0 V cut-off at a high temperature (45° C.) were performed for 150 cycles and the charge and the discharge capacity were measured. The ratio of the $150^{th}$ discharge capacity to the $1^{st}$ discharge capacity was calculated and the results are shown in FIG. 7.

Figure 7:
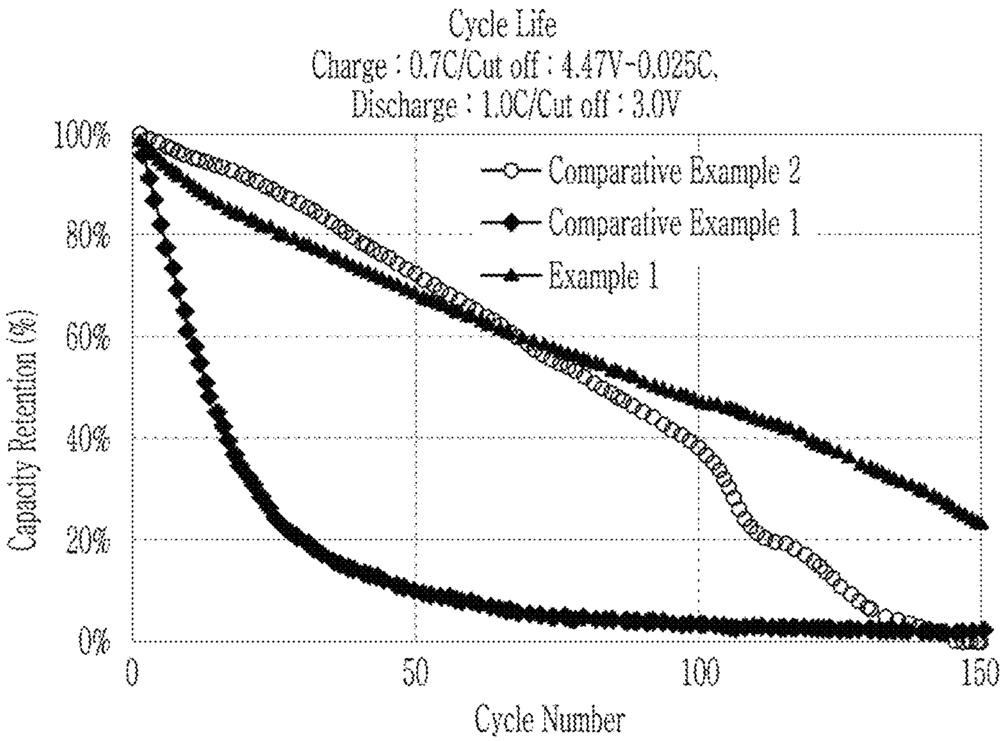
FIG. 7 is a graph showing the cycle-life characteristics of the coin full cell including the anode according to Example 1 and Comparative Examples 1 and 2.

As shown in FIG. 7, the coin-type full cell according to Example 1 using the anode with the CHF—$CO_3$ group-containing compound particles in the coating part and the surface area of the anode active material layer and the electrolyte with fluoroethylene carbonate exhibited excellent higher capacity retention, compared with Comparative Example 1 using the anode without the CHF—$CO_3$ group compound particles and the electrolyte without fluoroethylene carbonate.

Furthermore, Comparative Example 2 using the anode without the CHF—$CO_3$ group-containing compound particles and the electrolyte with fluoroethylene carbonate exhibited good capacity retention during the initial charge and discharge, but abruptly deteriorated capacity retention after about 70 charge and discharge cycles.

While this invention has been described in connection with what is presently considered to be practical example embodiments, it is to be understood that the invention is not limited to the disclosed embodiments, but, on the contrary, is intended to cover various modifications and equivalent arrangements included within the scope of the appended claims and attached drawings.

The invention claimed is:

1. An anode for a lithium secondary battery, the anode comprising:

a current collector;

an anode active material layer including an anode active material formed on the current collector; and a coating part formed on the anode active material layer, wherein the coating part and the anode active material layer include particles of a CHF—$CO_3$ group-containing compound, wherein an amount of the CHF—$CO_3$ group-containing compound particles included in the anode is 3 wt % to 6 wt %, based on the total of 100 wt % of the anode active material layer and the coating part, and wherein the CHF—$CO_3$ group-containing compound is represented by Chemical Formula 1 or Chemical Formula 2:

[Chemical Formula 1]

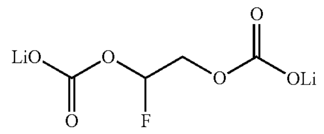

[Chemical Formula 2]

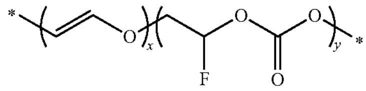

wherein, in Chemical Formula 2, x and y are each a mole fraction, and $0.1 \leq x \leq 0.9$, $0.1 \leq y \leq 0.9$, and $x+y=1$.

2. The anode of claim 1, wherein the CHF—$CO_3$ group-containing compound particles have an average particle diameter (D50) of 2 μm or less.

3. The anode of claim 1, wherein the CHF—$CO_3$ group-containing compound particles have an average particle diameter (D50) of 100 nm to 2 μm.

4. The anode of claim 1, wherein the coating part is formed by agglomerating the CHF—$CO_3$ group-containing compound particles.

5. The anode of claim 1, wherein the coating part has a thickness of 100 nm to 2 μm.

6. A lithium secondary battery, comprising the anode of claim 1;

a cathode; and a non-aqueous electrolyte.

7. The anode of claim 1, wherein the anode active material includes a carbon-based active material, a silicon-based active material, or a combination thereof.

8. The anode of claim 1, wherein the anode active material is crystalline carbon, amorphous carbon, or a combination thereof.

9. The anode of claim 1, wherein the anode active material is Si, a Si—C composite, SiOx (0<x<2), or a Si-Q alloy, wherein Q is an element selected from an alkali metal, an alkaline-earth metal, a Group 13 element, a Group 14 element, a Group 15 element, a Group 16 element, a transition metal, a rare earth element, or a combination thereof, but is not Si.

10. The anode of claim 1, wherein the anode active material is Sn, SnO2, or a S—R alloy, wherein R is an element selected from an alkali metal, an alkaline-earth metal, a Group 13 element, a Group 14 element, a Group 15 element, a Group 16 element, a transition metal, a rare earth element, or a combination thereof, but is not Si.

11. The anode of claim 1, wherein:

the CHF—$CO_3$ group-containing compound is represented by Chemical Formula 2, and a weight-average molecular weight of the CHF—$CO_3$ group-containing compound represented by Chemical Formula 2 is 1000 g/mol to 5,000,000 g/mol.

* * * * *